US 7,136,410 B2

(12) United States Patent
Choi et al.

(10) Patent No.: US 7,136,410 B2
(45) Date of Patent: Nov. 14, 2006

(54) ADAPTIVE INTERFERENCE SUPPRESSION RECEIVING APPARATUS FOR SPACE-TIME BLOCK CODED DIRECT SEQUENCE/CODE DIVISION MULTIPLE ACCESS COMMUNICATION SYSTEM

(75) Inventors: In-Kyeong Choi, Daejeon (KR);
Young-Ho Jung, Pusan (KR);
Seong-Rag Kim, Daejeon (KR);
Seung-Chul Hong, Daejeon (KR);
Yong-Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 751 days.

(21) Appl. No.: 10/331,946

(22) Filed: Dec. 31, 2002

(65) Prior Publication Data

US 2004/0047403 A1 Mar. 11, 2004

(30) Foreign Application Priority Data

Sep. 3, 2002 (KR) .................. 10-2002-0052764

(51) Int. Cl.
*H04B 1/707* (2006.01)
*H03H 7/40* (2006.01)

(52) U.S. Cl. .................. 375/148; 375/232; 375/231; 375/144

(58) Field of Classification Search ................ 375/130, 375/140, 147, 148, 316, 350, 347, 229, 231–233, 375/152, 259, 141, 143, 144; 370/310, 342, 370/441, 431, 334; 455/63.1, 65, 504, 501, 455/500, 506, 132, 137, 130
See application file for complete search history.

(56) References Cited

U.S. PATENT DOCUMENTS

| 6,175,588 | B1 * | 1/2001 | Visotsky et al. | 375/148 |
| 6,301,293 | B1 * | 10/2001 | Huang et al. | 375/130 |
| 6,377,636 | B1 * | 4/2002 | Paulraj et al. | 375/346 |
| 6,647,077 | B1 * | 11/2003 | Shan et al. | 375/346 |
| 2003/0043887 | A1 * | 3/2003 | Hudson | 375/144 |
| 2004/0198452 | A1 * | 10/2004 | Roy | 455/562.1 |

* cited by examiner

*Primary Examiner*—Temesghen Ghebretinsae
*Assistant Examiner*—Vineeta Panwalkar
(74) *Attorney, Agent, or Firm*—Mayer, Brown, Rowe & Maw LLP (57) ABSTRACT

An adaptive interference suppression receiver for a DS/CDMA system includes: input signal generators outputting a part of received signals of receiver antennas that has a coding block's transfer code; adaptive filter blocks filtering a complex signal output from the input signal generators with a tap weight updated based on a constraint MMSE criterion and estimating phase and amplitude components of a specific user channel using the filtering output signal to generate a channel-estimated signal; a signal restorer combining the channel-estimated signal and the filtering output signal and restoring an original signal; a signal selector for selecting known training data signal or the restored signal; and error generators comparing the channel-estimated signal and the filtering output signal and calculating an error between the two signals.

12 Claims, 7 Drawing Sheets

ADAPTIVE INTERFERENCE SUPPRESSION RECEIVING APPARATUS FOR SPACE-TIME BLOCK CODED DIRECT SEQUENCE/CODE DIVISION MULTIPLE ACCESS COMMUNICATION SYSTEM

BACKGROUND OF THE INVENTION (a) Field of the Invention

The present invention relates to a receiver for a MIMO (Multiple-Input Multiple-Output) antenna CDMA (Code Division Multiple Access) system. More specifically, the present invention relates to an adaptive MMSE (Minimum Mean Square Error) interference suppression receiving apparatus for a space-time block coded DS (Direct Sequence)/CDMA communication system.

(b) Description of the Related Art

In general, the MIMO antenna system is a communication system that transmits space-time block coded data via multiple transmitter antennas after data spreading with a different code by users, and receives data from users via multiple receiver antennas.

The conventional technologies concerning the structure of a receiver for the space-time block coded MIMO antenna system are disclosed in the following documents: Ref. 1: S. M. Alamounti, A simple transmitter diversity scheme for wireless communications, IEEE J. Select. Areas Commun., vol. 16, pp. 1451–1458, October, 1998; Ref. 2: V. Tarokh, H. Jafarkhani, and A. R. Calderbank, Space-time block codes from orthogonal designs, IEEE Trans. Inform. Theory, vol. 45, pp. 1456–1467, July 1999; and Ref. 3: A. F. Naguib, N. Seshadri, and A. R. Calderbank, Increasing Data Rate Over Wireless Channels, IEEE Signal Processing Magazine, vol. 17, No. 3, pp. 76–92, May 2000.

Ref. 1 and Ref. 2 disclose a space-time block coded TDMA system using two transmitter antennas, an optimal block coding transmission method for a system using at least two transmitter antennas, and a maximum likelihood receiver for the same.

The maximum likelihood receiver proposed in the two references can be applied for space-time block coded DS/CDMA systems and can provides an antenna diversity gain proportional to the product of the number of transmitter antennas and the number of receiver antennas, thereby guaranteeing an excellent data detection performance relative to general Rake receivers.

But the maximum likelihood receiver, which is devised on the assumption that the interference signal and the background noise other than the desired user's transfer signals are AWGN (Additive White Gaussian Noise), has a deterioration of performance in a MAI (Multiple Access Interference) environment.

On the other hand, the receiver of Ref. 3 is designed to enhance a reception performance by eliminating interference signals of other users under a circumstance in which multiple users are present in the TDMA system after space-time block coding. But the receiver has a loss of receiver antenna diversity in the order of as much as the number of interference signals to be removed, causing a deterioration of reception performance.

The above reception methods for the space-time block coded TDMA communication system can be expanded to the reception method for the space-time block coded DS/CDMA communication system with a little modification. However, the maximum likelihood receiver has a deterioration of performance due to the MAI that inevitably occurs in the CDMA environment when multiple users share a single channel, and the interference suppression receiver of Ref. 3 has a deterioration of data detection performance caused by a loss of diversity gain.

SUMMARY OF THE INVENTION

It is an object of the present invention to solve the problems with the prior art and to provide an adaptive MMSE interference suppression receiver that has an excellent data detection performance even in the multipath fading channel environment, which is an actual mobile communication channel environment, in the space-time block coded DS/CDMA system.

In one aspect of the present invention, there is provided an adaptive interference suppression receiver for a DS/CDMA communication system, which receives via a multipath fading channel a space-time block coded signal spread with another spreading code by users and despreads the received signal, the adaptive interference suppression receiver including: at least two input signal generators coupled to at least two receiver antennas for signal reception, respectively, the input signal generators outputting a part of the received signals of the respective receiver antennas that has a transfer code of a corresponding coding block; adaptive filter blocks coupled to the at least two input signal generators, respectively, the adaptive filter blocks filtering a complex signal output from the input signal generators with a tap weight updated based on at least one constraint MMSE (Minimum Mean Square Error) criterion and estimating phase and amplitude components of a specific user channel using the resultant filtering output signal to generate a channel-estimated signal, the number of the adaptive filter blocks being the same as the number of multipaths per one input signal generator; a signal restorer for combining the channel-estimated signal and the filtering output signal received from the adaptive filter blocks for all multipath components and restoring an original signal that is intended to be transferred by the specific user; a signal selector for selecting either one of a known training data signal or the restored signal of the signal restorer; and error generators for comparing the channel-estimated signal and the filtering output signal received from the adaptive filter blocks with the signal from the signal selector and calculating an error between the two signals for update of a tap weight in the adaptive filter blocks, the number of the error generators being the same as the number of the adaptive filter blocks.

The adaptive filter blocks include: an adaptive filter for filtering the output signal of the input signal generators according to the tap weight; a simple mean channel estimator for performing simple mean channel estimation using the filtering output signal of the adaptive filter and the output signal of the signal selector; and a multiple constraint criterion filter coefficient updater for regulating the tap weight of the adaptive filter based on at least two constraint MMSE criteria using the error signal of the error generators and the output signal of the adaptive filter.

Here, the at least two constraint MMSE criteria substantially constrain the inner product of the tap weight $w_{ml1}, w_{ml2}$ of the adaptive filter block for the l-th multipath component of the m-th receiver antenna and a spreading code vector $c_l$ of the corresponding multipath component to "1" and the inner product of the tap weight $w_{ml1}, w_{ml2}$ and a spreading code vector $c_i (i \neq l)$ of another multipath component to "0", thereby minimizing the error calculated by the error generators, the at least two constraint MMSE criteria being defined as the following equations:

$$\text{minimize}_{w_{ml1}} E\left[\left\|\hat{h}_{1ml}(n)b_1(n) + \hat{h}_{2ml}(n)b_2(n) - w_{ml1}^H r_{m1}(n)\right\|^2\right] \text{ subject to } C^H w_{ml1} = g_l$$

$$\text{minimize}_{w_{ml2}} E\left[\left\|\hat{h}_{2ml}(n)b_1^*(n) - \hat{h}_{1ml}(n)b_2^*(n) - w_{ml2}^H r_{m2}(n)\right\|^2\right] \text{ subject to } C^H w_{ml2} = g_l$$

wherein E is a mean value; $\hat{h}_{1ml}(n)$ is a channel estimated for the l-th multipath component between the first transmitter antenna and the m-th receiver antenna; $\hat{h}_{2ml}(n)$ is a channel estimated for the l-th multipath component between the second transmitter antenna and the m-th receiver antenna; $b_1(n),b_2(n)$ is the output signal of the signal selector for a corresponding coding block; $r_{m1}(n)$ is a vector corresponding to an interval of receiving odd transfer symbols of the n-th coding block; $r_{m2}(n)$ is a vector corresponding to an interval of receiving even transfer symbols of the n-th coding block; $g_1$ is a vector having a size of L×1 where the l-th term is "1" and the others are all "0", the vector being a constraint criterion added to extract only properly synchronized signals by the respective multipaths from a frequency-selective fading channel and to remove the effect of the desired user's other multipaths; $C=[c_1\ c_2\ \ldots\ c_L]$; and the subscript H represents a Hermitian operation.

The adaptive filter blocks update the tap weight $w_{ml}(n)$ that combines errors for the respective symbols according to the following equation and satisfies at least one constraint criterion, based on that the tap weight $w_{ml}(n)=w_{ml1}(n)$, $w_{ml2}(n)$ satisfying the MMSE criterion has a same solution:

$$w_{ml}(n+1)=w_{ml}(n)+\mu P_C^\perp [e_{ml,1}^*(n)r_{ml,1}(n)+ e_{ml,2}^*(n)r_{ml,2}(n)]$$

wherein $P_C^\perp = I - C(C^H C)^{-1} C^H$ represents an orthogonal projection matrix that projects all the vectors on a space orthogonal to C;

$$e_{m1} = \hat{h}_{1ml}(n)b_1(n) + \hat{h}_{2ml}(n)b_2(n) - w_{ml}^H r_{m1}(n)$$

$$e_{m2} = \hat{h}_{2ml}(n)b_1^*(n) - \hat{h}_{1ml}(n)b_2^*(n) - w_{ml}^H r_{m2}(n)$$

wherein $\mu$ is a step size that determines how fast the tap weight is changed; and the subscript * represents a complex conjugate operation.

The simple mean channel estimator estimates, for a predetermined number of received pilot symbols, a channel of the l-th multipath component between each transmitter antenna and the m-th receiver antenna by multiplying the filtering output signal of the adaptive filter by a complex conjugate of the output signal of the signal selector and then averaging the multiplication results according to the following equation:

$$\hat{h}_{1ml}(n) = \frac{1}{2N_P}\sum_{i=1}^{N_P} w_{ml}^H(n-iQ)(d_1^*(n-iQ)r_{m1}(n-iQ) - d_2^*(n-iQ)r_{m2}(n-iQ))$$

$$\hat{h}_{2ml}(n) = \frac{1}{2N_P}\sum_{i=1}^{N_P} w_{ml}^H(n-iQ)(d_2^*(n-iQ)r_{m1}(n-iQ) + d_1^*(n-iQ)r_{m2}(n-iQ))$$

wherein $N_P$ is the number of consecutive pilot symbols used for channel estimation; and Q is a pilot symbol insertion period.

The adaptive filter blocks include: an adaptive filter for filtering the output signal of the input signal generators according to the tap weight; a maximum likelihood channel estimator for performing maximum likelihood channel estimation using the filtering output signal of the adaptive filter and the output signal of the signal selector; and a single constraint criterion filter coefficient updater for regulating the tap weight of the adaptive filter based on a single constraint MMSE criterion using the error signal of the error generators and the output signal of the adaptive filter.

Here, the single constraint MMSE criterion substantially constrains the inner product of the tap weight $w_{ml1}, w_{ml2}$ of the adaptive filter block for the l-th multipath component of the m-th receiver antenna and a spreading code vector $c_l$ of the corresponding multipath component to "1", thereby minimizing the error calculated by the error generators, the single constraint MMSE criterion being defined as the following equations:

$$\text{minimize}_{w_{ml1}} E\left[\left\|h_{1ml}(n)b_1(n) + h_{2ml}(n)b_2(n) - w_{ml1}^H r_{m1}(n)\right\|^2\right] \text{ subject to } w_{ml1}^H c_l = 1$$

$$\text{minimize}_{w_{ml2}} E\left[\left\|h_{2ml}(n)b_1^*(n) - h_{1ml}(n)b_2^*(n) - w_{ml2}^H r_{m2}(n)\right\|^2\right] \text{ subject to } w_{ml2}^H c_l = 1$$

wherein E is a mean value; $h_{1ml}(n)$ is a channel estimated for the l-th multipath component between the first transmitter antenna and the m-th receiver antenna; $h_{2ml}(n)$ is a channel estimated for the l-th multipath component between the second transmitter antenna and the m-th receiver antenna; $b_1(n),b_2(n)$ is the output signal of the signal selector for a corresponding coding block; $r_{m1}(n)$ is a vector corresponding to an interval of receiving odd transfer symbols of the n-th coding block; $r_{m2}(n)$ is a vector corresponding to an interval of receiving even transfer symbols of the n-th coding block; and the subscript H represents a Hermitian operation.

The adaptive filter blocks update the tap weight $w_{ml}(n)$ that combines errors for the respective symbols according to the following equation and satisfies the single constraint criterion, based on that the tap weight $w_{ml}(n)=w_{ml1}(n)$, $w_{ml2}(n)$ satisfying the MMSE criterion has a same solution:

$$w_{ml}(n+1)=w_{ml}(n)+\mu P_{c_l}^\perp [e_{ml,1}^*(n)r_{ml,1}(n)+ e_{ml,2}^*(n)r_{ml,2}(n)]$$

wherein $P_{c_l}^\perp = I - c_l c_l^H / (c_l^H c_l)$ represents an orthogonal projection matrix that projects all the vectors on a space orthogonal to $C_l$; and $$e_{ml1} = \hat{h}_{1ml}(n)b_1(n) + \hat{h}_{2ml}(n)b_2(n) - w_{ml}^H r_{m1}(n)$$

$$e_{ml2} = \hat{h}_{2ml}(n)b_1^*(n) - \hat{h}_{1ml}(n)b_2^*(n) - w_{ml}^H r_{m2}(n)$$

wherein $\mu$ is a step size that determines how fast the tap weight is changed; and the subscript * represents a complex conjugate operation.

The maximum likelihood channel estimator estimates, for a predetermined number of received pilot symbols, a channel of the multipath component between each transmitter antenna and the m-th receiver antenna by multiplying the filtering output signal of the adaptive filter by a complex conjugate of the output signal of the signal selector and then averaging the multiplication results according to the following equation:

$$\begin{bmatrix} \hat{h}_{1m1} & \hat{h}_{2m1} \\ \hat{h}_{1m2} & \hat{h}_{2m2} \\ \vdots & \vdots \\ \hat{h}_{1mL} & \hat{h}_{2mL} \end{bmatrix} =$$

$$\frac{1}{2N_P}\sum_{i=1}^{N_p} \begin{bmatrix} 1 & w_{m1}^H(n-iQ)c_2 & \cdots & w_{m1}^H(n-iQ)c_L \\ w_{m2}^H(n-iQ)c_1 & 1 & \cdots & w_{m2}^H(n-iQ)c_L \\ \vdots & \vdots & \ddots & \vdots \\ w_{mL}^H(n-iQ)c_1 & w_{mL}^H(n-iQ)c_2 & \cdots & 1 \end{bmatrix}^{-1} \cdot W_m^H A$$

wherein $W_m = [w_{m1}\ w_{m2}\ \ldots\ w_{mL}]$, $A = [d_1^*(n-iQ)r_{m1}(n-iQ) - d_2^*(n-iQ)r_{m2}(n-iQ) d_2^*(n-iQ)r_{m1}(n-iQ) + d_1^*(n-iQ)r_{m2}(n-iQ)]$ The signal restorer includes: a coupler for receiving the output signal $y_{ml,1}(n), y_{ml,2}(n)$ of the adaptive filter and the resultant signal of channel estimation $\hat{h}_{1ml}(n), \hat{h}_{2ml}(n)$ and combining them for all the multipath components to generate a combined signal $\bar{d}_1(n), \bar{d}_2(n)$; and a data determiner for restoring an original signal $\hat{d}_1(n), \hat{d}_2(n)$ that is intended to be transferred by the specific user, using the combined signal $\bar{d}_1(n), \bar{d}_2(n)$ of the coupler according to the following equation:

$$\hat{d}_1 = \arg\min_{\hat{d}} \left\| \sum_{m=1}^{M}\sum_{l=1}^{L} \left[ y_{ml,1}(n)\hat{h}_{1ml}^*(n) + y_{ml,2}^*(n)\hat{h}_{2ml}(n) \right] - \bar{d} \right\|$$

$$\hat{d}_2 = \arg\min_{\hat{d}} \left\| \sum_{m=1}^{M}\sum_{l=1}^{L} \left[ y_{ml,1}(n)\hat{h}_{2ml}^*(n) - y_{ml,2}^*(n)\hat{h}_{1ml}(n) \right] - \bar{d} \right\|$$

wherein $\bar{d}$ is a symbol on a constellation corresponding to the combined signal $\bar{d}_1(n), \bar{d}_2(n)$.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
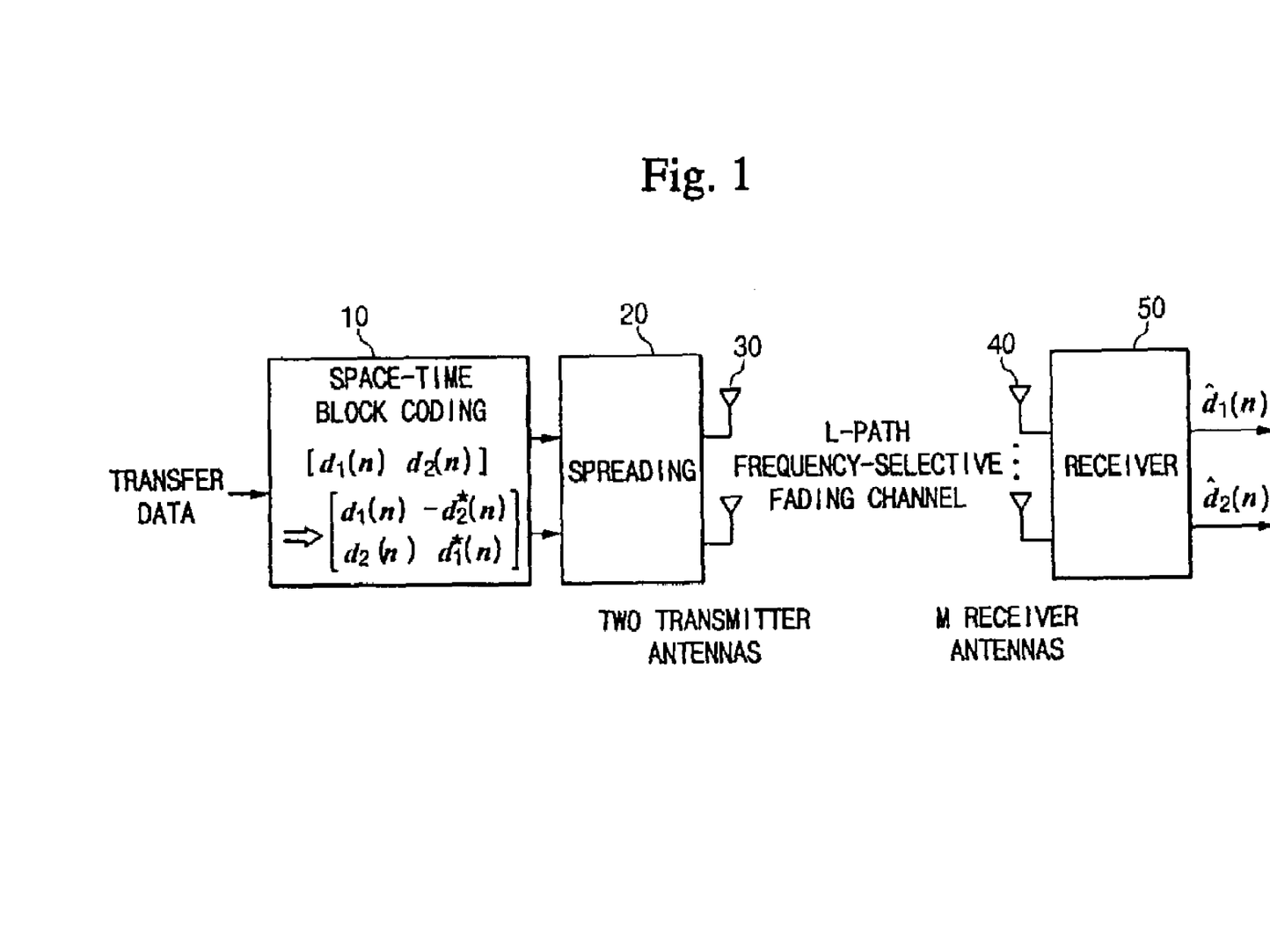
FIG. 1 illustrates an example of a space-time block coded DS/CDMA system using two transmitter antennas in accordance with an embodiment of the present invention.

FIG. 1 shows an example of a space/time block coded DS/CDMA system using two transmitter antennas.

The space/time block coded DS/CDMA MIMO antenna system shown in FIG. 1 performs space/time block coding 10 and spreading 20 of data to be transferred from its transmitter, sends the space/time block coded and spread data via two transmitter antennas 30, and receives transfer data $\hat{d}_1(n), \hat{d}_2(n)$ using M (where M is an integer being at least 2) receiver antennas 40 at a receiver 50 and restores them to reception data.

In this system, the fading channel at time t is given by the following equation:

$$h_{(t)} = \sum_{i=1}^{2}\sum_{m=1}^{M}\sum_{l=1}^{L} h_{(t),iml}\delta_{(t-\tau_l)} \qquad \text{Equation 1}$$

where $h_{(t),iml}$ is a channel coefficient of the l-th path received on the m-th receiver antenna from the i-th transmitter antenna 40, and $\tau_l$ is a transmission delay of the l-th path and is expediently given by $\tau_l = (l-1)T_c$ (where $T_c$ is the chip period).

Assuming that the channel is not changed in the interval of transmitting the respective coding blocks, the channel coefficient is given by $h_{(t),iml} = h_{iml}(n)$ when $2nT \leq t < (2n+1)T$ where T is the symbol period.

Figure 2:
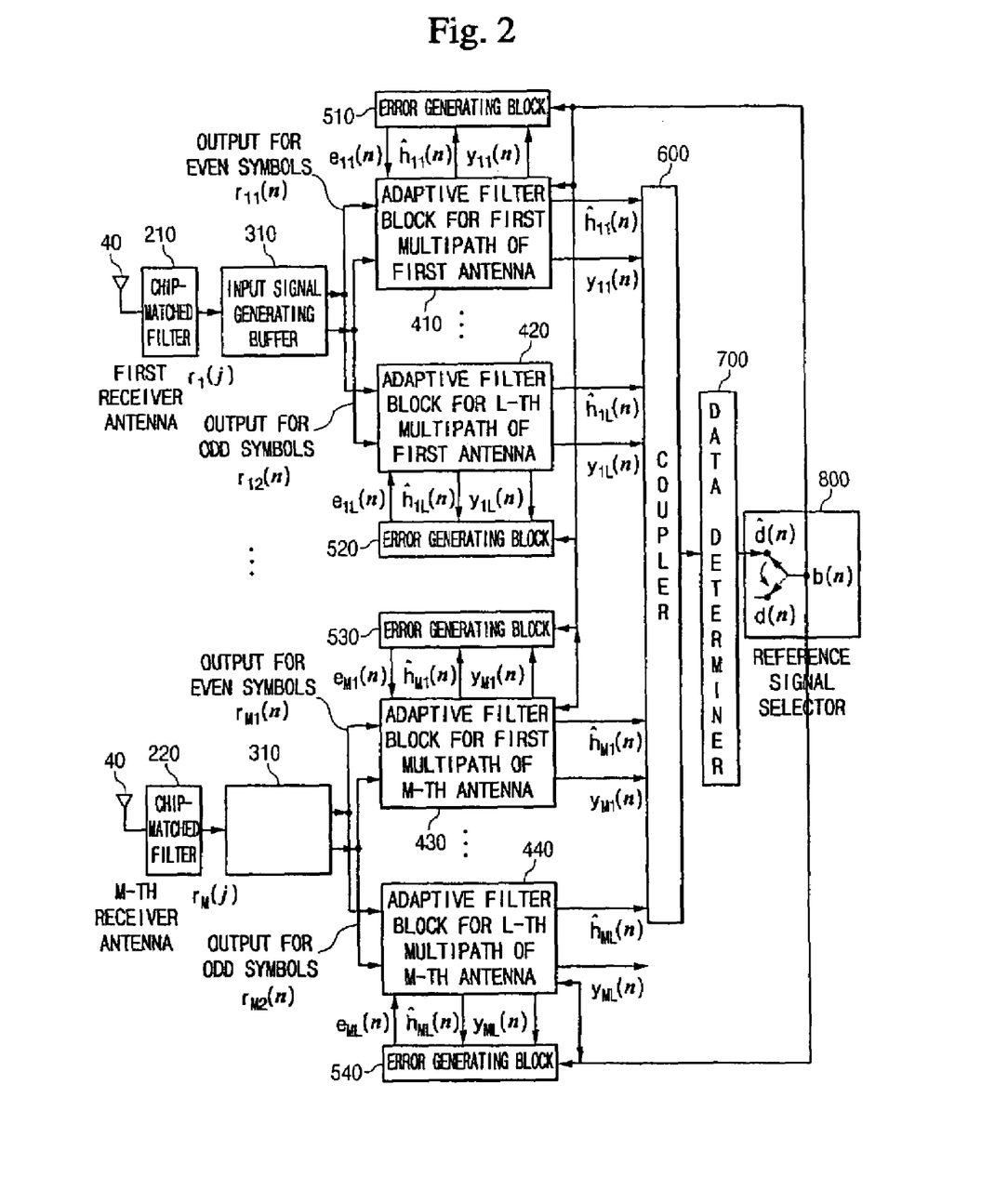
FIG. 2 is a detailed block diagram of an adaptive interference suppression receiver for the space-time block coded DS/CDMA MIMO antenna system shown in FIG. 1.

FIG. 2 is a detailed block diagram of the adaptive interference suppression receiver 50 for the space-time block coded DS/CDMA MIMO antenna system shown in FIG. 1.

The adaptive interference suppression receiver 50 comprises, as shown in FIG. 2, chip-matched filters 210 and 220; input signal generating buffers 310 and 320; adaptive filter blocks 410, 420, 430, and 440; error generating blocks 510, 520, 530, and 540; a coupler 600; a data determiner 700; and a reference signal selector 800.

First, the chip-matched filters 210 and 220 perform matched-filtering of the signals received from the M antennas 40 on the basis of the chip period.

The input signal generating blocks 310 and 320 generate vectors corresponding to the signal blocks output from the chip-matched filters 210 and 220 and output the generated vectors according to the symbol period.

The adaptive filter blocks 410, 420, 430, and 440 filter the output signals of the input signal generating buffers 310 and 320 according to a tap weight that is regulated with a specific cycle.

The coupler 600 combines the output signals of the adaptive filter blocks 410, 420, 430, and 440 for all the multipath components.

The data determiner 700 restores the output signal of the coupler 600 to the original signal that is intended to be transferred by a specific user.

The reference signal selector 800 selectively outputs either the output signal of the data determiner 700 or a known training data signal.

The error generating blocks 510, 520, 530, and 540 use the output signals of the reference signal selector 800 and the adaptive filter blocks 410, 420, 430, and 440 and generate an error signal for regulating the tap weight to be used in the adaptive filter blocks 410, 420, 430, and 440.

Here, the number of the adaptive filter blocks 410, 420, 430, and 440 are L×M, where L is the number of the multipath components and M is the number of the receiver antennas 40.

Let $r_m(j)$ be the output of the chip-matched filters 210 and 220 for the received signals of the m-th receiver antenna 40, and these signals are fed into the input signal generating buffers 310 and 320. The input signal generating buffers 310 and 320 generate a vector $r_{m1}(n)$ corresponding to an interval of receiving odd transfer symbols of the n-th coding block and a vector $r_{m2}(n)$ corresponding to an interval of receiving even transfer symbols of the n-th coding block from the output signals of the chip-matched filters 210 and 220, and transmitting the generated vectors to the corresponding adaptive filter blocks 410, 420, 430, and 440 according to the symbol period. Let $c=[c_1 \ldots c_L]^T$ be the normalized spreading code for the desired user's l-th path and $c_l=[0_{l-1}{}^T c^T 0_{L-l}{}^T]^T$ (where $O_l$ is the l×0 vector) be the spreading code for the l-th path, then the received signal matrix $r_m(n)$ of the m-th antenna for the n-th coding block can be expressed by the following equation:

$$r_m(n) = [r_{m1}(n) \, r_{m2}(n)] \quad \text{Equation 2}$$

$$= \begin{bmatrix} r_m(2nN) & r_m(2nN+N) \\ \vdots & \vdots \\ r_m(2nN+N+L-2) & r_m(2nN+2N+L-2) \end{bmatrix}$$

$$= \underbrace{[c_1 \cdots c_L]}_{\equiv c} \underbrace{\begin{bmatrix} h_{1m1}(n) & h_{2m1}(n) \\ \vdots & \vdots \\ h_{Lm1}(n) & h_{Lm1}(n) \end{bmatrix}}_{\equiv H_m(n)} \underbrace{\begin{bmatrix} d_1(n) & -d_2^*(n) \\ d_2(n) & d_1^*(n) \end{bmatrix}}_{\equiv D(n)} +$$

$$\underbrace{[u_{m1}(n) \, u_{m2}(n)]}_{\equiv u_m(n)}$$

$$= cH_m(n)D(n) + u_m(n)$$

where $u_m(n)$ is a matrix having a size of (N+M−1)×2 that represents a signal impaired by MAI (Multiple-Access Interference), ISI (Inter-Symbol Interference), and AWGN (Additive White Gaussian Noise). Expediently, it is assumed that the earlier multipath component is processed with the previous adaptive filter block (i.e., having the smaller index value).

The maximum likelihood receiver for the space-time block coded CDMA MIMO antenna system in the frequency-selective fading channel environment can be induced from the receivers of Ref. 1 and Ref. 2 as follows. The matched filter output vector $\tilde{y}_m(n)$ having a size of 2L×1 for $r_m(n)$ can be expressed by the following equation:

$$\tilde{y}_m(n) = \begin{bmatrix} c_1^H r_{m1}(n) \\ (c_1^H r_{m2}(n))^* \\ \vdots \\ c_L^H r_{m1}(n) \\ (c_L^H r_{m2}(n))^* \end{bmatrix} \underbrace{\begin{bmatrix} h_{1m1}(n) & h_{2m1}(n) \\ h_{2m1}^*(n) & -h_{1m1}^*(n) \\ \vdots & \vdots \\ h_{1mL}(n) & h_{2mL}(n) \\ h_{2mL}^*(n) & -h_{1mL}^*(n) \end{bmatrix}}_{\equiv \tilde{H}_m(n)} \underbrace{\begin{bmatrix} d_1(n) \\ d_2(n) \end{bmatrix}}_{\equiv d(n)} + \tilde{u}_m(n)$$

$$\text{Equation 3}$$

$$= \tilde{H}_m(n) d(n) + \tilde{u}_m(n)$$

where $\tilde{u}_m(n)$ is a signal impaired by AWGN, MAI, and ISI. Working with the normal distribution of $\tilde{u}_m(n)$, the maximum likelihood receiver can be induced in the same manner as in the TDMA system as expressed by the following equation:

$$\hat{d}_{ML}(n) = \arg\min_{\hat{d}} \sum_{m=1}^{M} \|\tilde{y}_m(n) - \tilde{H}_m(n) \cdot \hat{d}\|^2 \quad \text{Equation 4}$$

To summarize the above cost function, it can be divided into two cost functional equations related to $d_1(n), d_2(n)$, respectively, as shown in the following equation, and used for data detection:

$$\hat{d}_{1,ML}(n) = \arg\min_{\hat{d}} \quad \text{Equation 5}$$

$$\left\| \sum_{m=1}^{M} \sum_{l=1}^{L} [c_1^H r_{m1}(n) h_{1ml}^*(n) + (c_1^H r_{m1}(n))^* h_{2ml}(n)] - \hat{d} \right\|$$

$$\hat{d}_{2,ML}(n) = \arg\min_{\hat{d}}$$

$$\left\| \sum_{m=1}^{M} \sum_{l=1}^{L} [c_1^H r_{m1}(n) h_{2ml}^*(n) - (c_1^H r_{m1}(n))^* h_{1ml}(n)] - \hat{d} \right\|.$$

In case of data despreading with spreading codes as in the maximum likelihood receiver, the despread signals are impaired as $\tilde{u}_m(n)$ by MAI and inter-path interference in addition to AWGN, causing a performance deterioration.

The embodiment of the present invention involves despreading using adaptive filter coefficients optimal in the aspect of the CMMSE (Constrained Minimum Mean Square Error) instead of using the spreading codes to effectively eliminate all the interference signals, thus increasing the reception performance.

Let $w_{ml1}$ be an adaptive filter coefficient for odd received signals for the l-th multipath component of the m-th antenna and $w_{ml2}$ be an adaptive filter coefficient for even received signals, then in the first embodiment, the tap weights of the respective adaptive filters are determined so as to minimize the CMMSE cost function of the following equation 6.

Namely, the inner product of the coefficient $w_{ml1}, w_{ml2}$ of the adaptive filter for the l-th multipath component of the m-th receiver antenna and the spreading code vector $c_l$ of the corresponding multipath component is substantially constrained to "1", and the inner product of the filter coefficient $w_{ml1}, w_{ml2}$ and the spreading code vector $c_i (i \neq l)$ of another multipath component is substantially constrained to "0", thereby minimizing the CMMSE cost product.

$$\text{minimize}_{w_{ml1}} E\left[\left\|\hat{h}_{1ml}(n)b_1(n) + \hat{h}_{2ml}(n)b_2(n) - w_{ml1}^H r_{m1}(n)\right\|^2\right] \text{ subject to } C^H w_{ml1} = g_l$$

$$\text{minimize}_{w_{ml2}} E\left[\left\|\hat{h}_{2ml}(n)b_1^*(n) - \hat{h}_{1ml}(n)b_2^*(n) - w_{ml2}^H r_{m2}(n)\right\|^2\right] \text{ subject to } C^H w_{ml2} = g_l$$

Equation 6 where E is a mean value; $\hat{h}_{1ml}(n)$ is a channel estimated for the l-th multipath component between the first transmitter antenna and the m-th receiver antenna; $\hat{h}_{2ml}(n)$ is a channel estimated for the l-th multipath component between the second transmitter antenna and the m-th receiver antenna; $b_1(n), b_2(n)$ is an output signal of the reference signal selector 800 for the corresponding coding block; $g_l$ is a vector having a size of L×1 where the l-th term is 1 and the others are all 0, the vector being a constraint criterion added to extract only properly synchronized signals by the respective multipaths from a frequency-selective fading channel and to remove the effect of the desired user's other multipaths; $C = [c_1 \, c_2 \ldots c_L]$; and the subscript H represents the Hermitian operation.

This eliminates the inter-path interference caused by the user's other multipaths as well as MAI and determines an unbiased channel estimate even by a simple mean channel estimation method using the adaptive filter output, thereby increasing reception performance.

The optimal filter coefficients $w_{ml1}^0$ and $w_{ml1}^0$ that minimize a given constraint cost function can be calculated by the Lagrangian multiplier method according to the following equation:

$$w_{ml1}^0 = R_{r_{m1}}^{-1} C (C^H R_{r_{m1}}^{-1} C)^{-1} g_l$$

$$w_{ml2}^0 = R_{r_{m2}}^{-1} C (C^H R_{r_{m2}}^{-1} C)^{-1} g_l$$

Equation 7 where $R_{r_{m1}} = E[r_{m1}(n) r_{m1}^H(n)]$ and $R_{r_{m2}} = E[r_{m2}(n) r_{m2}^H(n)]$ can be rewritten to have the same value as in the following equation, giving the same optimal solution:

$$R_{r_{m1}} = R_{r_{m2}} = R_{u_m} + \sum_{i=1}^{L} E[(|h_{1mi}(n)|^2 + |h_{2mi}(n)|^2) \cdot c_i c_i^H]$$

Equation 8

As the two adaptive filters have the same optimal solution as in the equation 8, it is more effective to average two error values and use the mean value in updating the filter coefficient rather than to independently adapt the filters.

By using the adaptive filter coefficient $w_{ml}(n)$ for the l-th multipath component of the m-th receiver antenna in filtering for both odd and even symbols, the error values between the adaptive filter outputs of odd and even received signals and the reference signal are properly combined to update the filter coefficient according to the following equation:

$$w_{ml}(n+1) = w_{ml}(n) + \mu P_C^\perp [e_{ml,1}^*(n) r_{ml,1}(n) + e_{ml,2}^*(n) r_{ml,2}(n)]$$

Equation 9 where $P_C^\perp = I - C(C^H C)^{-1} C^H$ represents an orthogonal projection matrix that projects all the vectors on a space orthogonal to C;

$$e_{m1} = \hat{h}_{1ml}(n) b_1(n) + \hat{h}_{2ml}(n) b_2(n) - w_{ml}^H r_{m1}(n)$$

$$e_{m2} = \hat{h}_{2ml}(n) b_1^*(n) - \hat{h}_{1ml}(n) b_2^*(n) - w_{ml}^H r_{m2}(n)$$

where $\mu$ is a step size that determines how fast the tap weight of the adaptive filter is changed; and the subscript * represents a complex conjugate operation.

The error generating blocks 510, 520, 530, and 540 shown in FIG. 2 combine the outputs $y_{ml}, \hat{h}_{ml}$ of the adaptive filter blocks 410, 420, 430, and 440 and the output b(n) of the reference signal selector 800 to generate two error signals $e_{ml1}, e_{ml2}$.

Figure 3:
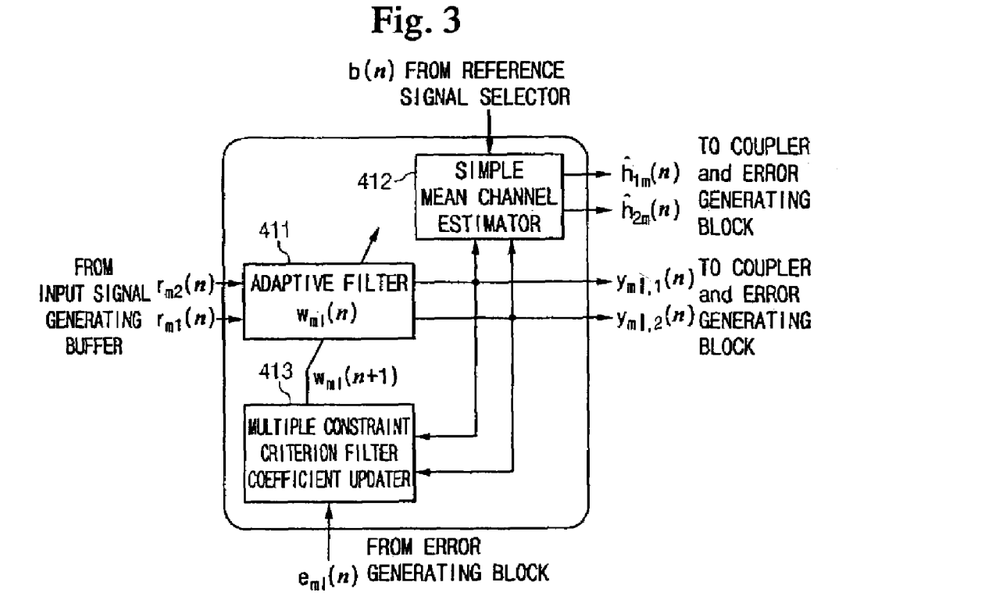
FIG. 3 is a diagram of the adaptive filter block shown in FIG. 2.

FIG. 3 illustrates the adaptive filter block shown in FIG. 2, in which an adaptive filter block for the l-th path of the m-th receiver antenna is shown.

The adaptive filter block comprises, as shown in FIG. 3, an adaptive filter 411, a simple mean channel estimator 412, and a multiple constraint criterion filter coefficient updater 413.

First, the adaptive filter 411 receives the output signals $r_{m1}(n), r_{m2}(n)$ of the input signal generating buffers 310, 320, 330, and 340 to generate adaptive filter signals $y_{ml1}, y_{ml2}$ for the received signals of the m-th antenna. Let $y_m(n)$ be a vector composed of those signals, then it can be expressed by the following equation 10.

The filter output comprising the vector $y_m(n)$ is acquired by adapting a tap weight to the input signal and can be defined as $w_{m1}^H r_{m1}(n) \equiv y_{ml,1}, w_{m1}^H r_{m2}(n) \equiv y_{ml,2}$ (i.e., $y_{ml} \equiv [y_{ml,1} y_{ml,2}^*]$).

$$y_m(n) = \begin{bmatrix} w_{m1}^H r_{m1}(n) \\ (w_{m1}^H r_{m2}(n))^* \\ \vdots \\ w_{mL}^H r_{m1}(n) \\ (w_{mL}^H r_{m2}(n))^* \end{bmatrix} = \begin{bmatrix} y_{m1,1}(n) \\ y_{m1,2}^*(n) \\ \vdots \\ y_{mL,1}(n) \\ y_{mL,2}^*(n) \end{bmatrix} =$$

$$\underbrace{\begin{bmatrix} h_{1m1}(n) & h_{2m1}(n) \\ h_{2m1}^*(n) & -h_{1m1}^*(n) \\ \vdots & \vdots \\ h_{1mL}(n) & h_{2mL}(n) \\ h_{2mL}^*(n) & -h_{1mL}^*(n) \end{bmatrix}}_{\equiv \tilde{H}_m(n)} \underbrace{\begin{bmatrix} d_1(n) \\ d_2(n) \end{bmatrix}}_{\equiv d(n)} + \bar{u}_m(n) = \tilde{H}_m(n) d(n) + \bar{u}_m(n)$$

Equation 10 where $\bar{u}_m(n)$ is a noise signal that is obtained by removing the received signals of MAI and inter-path interference, and it is presumed to be AWGN.

From the above signal model, the maximum likelihood receiver that employs an interference suppression receiver can be readily induced according to the following equation:

$$\hat{d}_{CMMSE+ML}(n) = \arg \min_{\hat{d}} \sum_{m=1}^{M} \left\| y_m(n) - \hat{H}_m(n) \cdot \hat{d} \right\|^2$$

Equation 11

The cost function in the equation 11 can be divided into two cost functions related to $d_1(n)$ and $d_2(n)$, respectively, as expressed by the following equation 12, and used for data detection:

$$\hat{d}_{1,CMMSE+ML}(n) = \arg\min_{\hat{d}} \left\| \sum_{m=1}^{M}\sum_{l=1}^{L}\left[w_{ml}^H r_{m1}(n)\hat{h}_{1ml}^*(n) + (w_{ml}^H r_{m1}(n))^* \hat{h}_{2ml}(n)\right] - \hat{d} \right\|$$

$$= \arg\min_{\hat{d}} \left\| \sum_{m=1}^{M}\sum_{l=1}^{L}\left[y_{ml,1}(n)\hat{h}_{1ml}^*(n) + y_{ml,2}^*(n)\hat{h}_{2ml}(n)\right] - \hat{d} \right\|$$

$$\hat{d}_{2,CMMSE+ML}(n) = \arg\min_{\hat{d}} \left\| \sum_{m=1}^{M}\sum_{l=1}^{L}\left[w_{ml}^H r_{m1}(n)\hat{h}_{2ml}^*(n) - (w_{ml}^H r_{m1}(n))^* \hat{h}_{1ml}(n)\right] - \hat{d} \right\|$$

$$= \arg\min_{\hat{d}} \left\| \sum_{m=1}^{M}\sum_{l=1}^{L}\left[y_{ml,1}(n)\hat{h}_{2ml}^*(n) - y_{ml,2}^*(n)\hat{h}_{1ml}(n)\right] - \hat{d} \right\|$$

Equation 12

On the other hand, the simple mean channel estimator 412 estimates channel parameters using pilot symbols received from the transmitter.

In the first embodiment, the following equation 13 is applied to determine channel estimates $\hat{h}_{1ml}(n)$ and $\hat{h}_{2ml}(n)$ for $h_{1ml}(n)$ and $h_{2ml}(n)$. To reduce the effect of noises, preliminary channel estimates obtained from multiple pilot symbols are averaged to give a final channel estimate.

$$\hat{h}_{1ml}(n) = \frac{1}{2N_P}\sum_{i=1}^{N_P} w_{ml}^H(n - iQ)(d_1^*(n-iQ)r_{m1}(n-iQ) - d_2^*(n-iQ)r_{m2}(n-iQ))$$

$$\hat{h}_{2ml}(n) = \frac{1}{2N_P}\sum_{i=1}^{N_P} w_{ml}^H(n - iQ)(d_2^*(n-iQ)r_{m1}(n-iQ) + d_1^*(n-iQ)r_{m2}(n-iQ))$$

Equation 13 where $N_P$ is the number of consecutive pilot symbols used for channel estimation; and Q is a pilot symbol insertion period.

The above channel estimate is a maximum likelihood (ML) channel estimate that is unbiased and acquired on the assumption that the channel is estimated with multiple adaptive filters having multiple constraint criteria.

The multiple constraint criterion filter coefficient updater 413 uses the outputs $e_{ml}(n)$ of the error generating blocks 510, 520, 530, and 540 and the outputs $y_{ml,1}(n), y_{ml,2}(n)$ of the adaptive filters 411 to update the filter coefficient $w_{ml}(n)$ of the adaptive filter 411 according to the equation 9.

Figure 5:
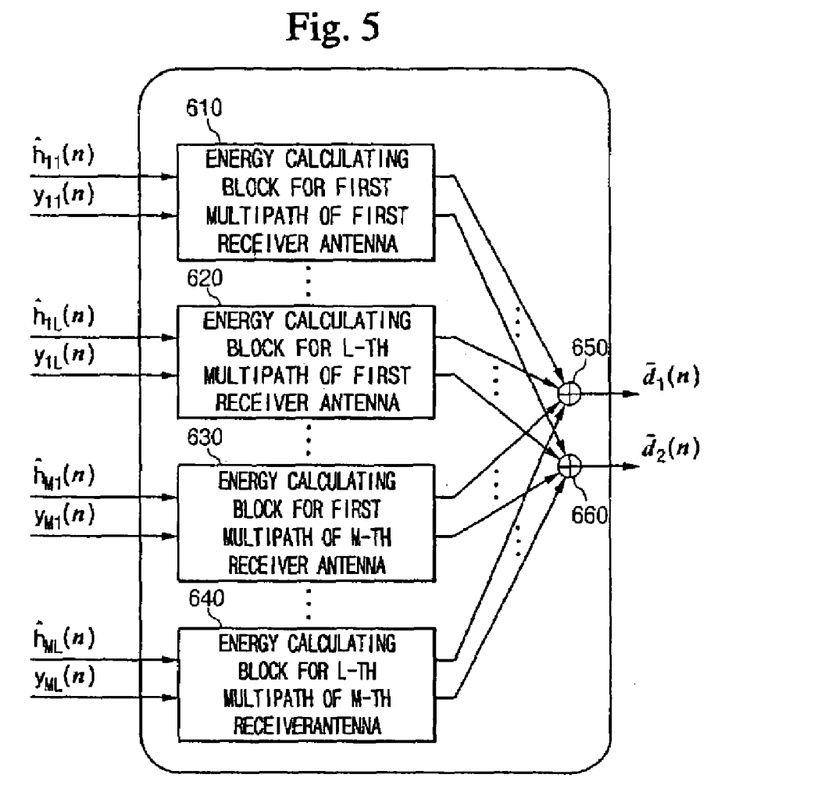
FIG. 5 is a detailed block diagram of the coupler shown in FIG. 2.

FIG. 5 is a detailed block diagram of the coupler 600 shown in FIG. 2.

The coupler 600 is for calculating the parts $$\sum_{m=1}^{M}\sum_{l=1}^{L}\left[y_{ml,1}(n)\hat{h}_{1ml}^*(n) + y_{ml,2}^*(n)\hat{h}_{2ml}(n)\right] \text{ and}$$

$$\sum_{m=1}^{M}\sum_{l=1}^{L}\left[y_{ml,1}(n)\hat{h}_{2ml}^*(n) - y_{ml,2}^*(n)\hat{h}_{1ml}(n)\right] \text{ of}$$

the equation 12 using the output $y_{ml}(n)$ of the adaptive filter blocks 410, 420, 430, and 440 and the channel estimation result $\hat{h}_{ml}(n)$, and it comprises, as shown in FIG. 5, L×M energy calculating blocks 610, 620, 630, and 640 and two summators 650 and 660.

Figure 6:
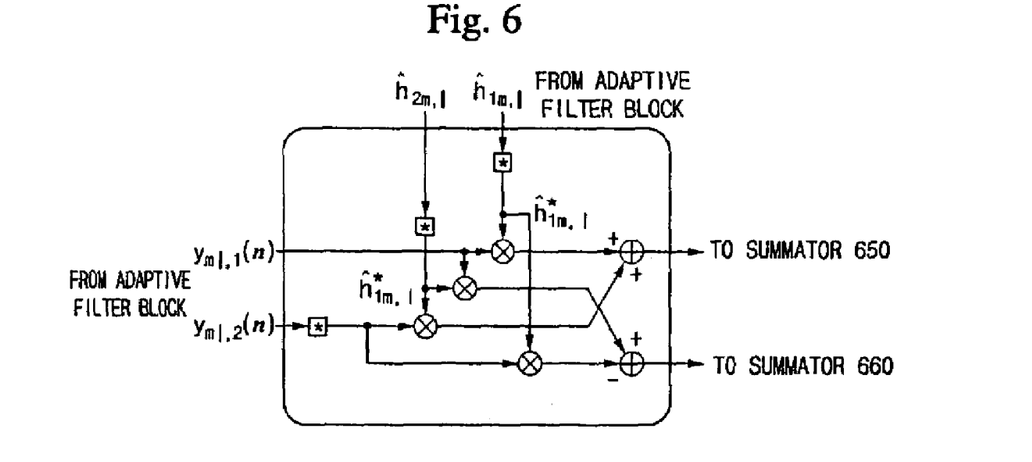
FIG. 6 is a diagram of the energy calculating block shown in FIG. 2.

FIG. 6 is a diagram of the energy calculating blocks 610, 620, 630, and 640 shown in FIG. 5, in which an energy calculating block for the l-th path of the m-th receiver antenna is illustrated.

The energy calculating blocks 610, 620, 630, and 640 comprise, as shown in FIG. 6, three complex conjugate calculators 611, 612, and 613, four multipliers 614, 615, 616, and 617, and two summators 618 and 619.

First, the complex conjugate calculators 611, 612, and 613 calculate complex conjugates for the output $y_{ml,2}(n)$ of the adaptive filter 411 and the output $\hat{h}_{2m,l}(n)\hat{h}_{1m,l}(n)$ of the simple mean channel estimator 412.

The multiplier 614 multiplies the outputs of the complex conjugate calculators 611 and 612 to output $y_{ml,2}^*(n) \cdot \hat{h}_{2m,l}^*(n)$; the multiplier 615 multiplies the output of the adaptive filter 411 by the output of the complex conjugate calculator 612 to output $y_{ml,1}(n) \cdot \hat{h}_{2m,l}^*(n)$; the multiplier 616 multiplies the output of the adaptive filter 411 by the output of the conjugate calculator 613 to output $y_{ml,1}(n) \cdot \hat{h}_{1m,l}^*(n)$; and the multiplier 617 multiplies the outputs of the complex conjugate calculators 611 and 613 to output $y_{ml,2}^*(n)\hat{h}_{1m,l}^*(n)$.

The summator 618 sums the outputs of the multipliers 614 and 616 to output $y_{ml,1}(n) \cdot \hat{h}_{1m,l}^*(n) + y_{ml,2}^*(n) \cdot \hat{h}_{2m,l}^*(n)$ to the summator 650; and the summator 619 sums the outputs of the multipliers 615 and 617 to output $y_{ml,1}(n) \cdot \hat{h}_{2m,l}^*(n) + y_{ml,2}^*(n) \cdot \hat{h}_{1m,l}^*(n)$ to the summator 660.

Finally, the summator 650 sums the outputs of the energy calculating blocks 610, 620, 630, and 640 for L multipath components and M receiver antennas 40 to output $$\sum_{m=1}^{M}\sum_{l=1}^{L}\left[y_{ml,1}(n)\hat{h}_{1ml}^*(n) + y_{ml,2}^*(n)\hat{h}_{2ml}(n)\right] \text{ as } \bar{d}_1(n);$$

and the summator 660 sums the outputs of the energy calculating blocks 610, 620, 630, and 640 for L multipath components and M receiver antennas 40 to output $$\sum_{m=1}^{M}\sum_{l=1}^{L}\left[y_{ml,1}(n)\hat{h}_{2ml}^*(n) - y_{ml,2}^*(n)\hat{h}_{1ml}(n)\right] \text{ as } \bar{d}_2(n).$$

Figure 7:
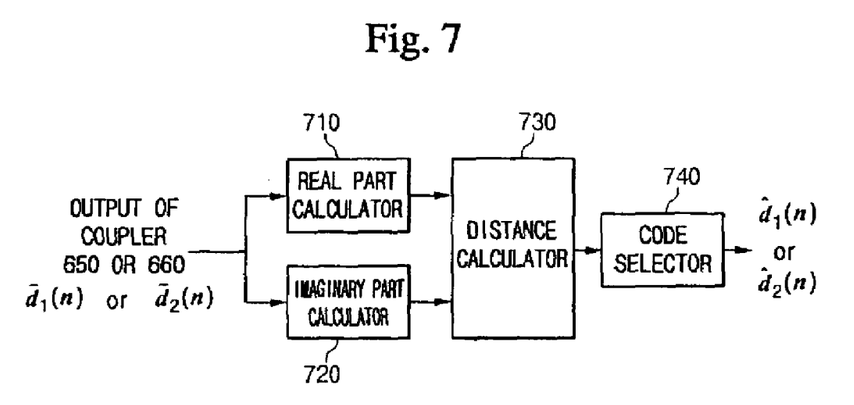
FIG. 7 is a detailed block diagram of the data determiner shown in FIG. 2.

FIG. 7 is a detailed block diagram of the data determiner 700 shown in FIG. 2.

The data determiner 700 calculates a distance between the output $\bar{d}_1(n), \bar{d}_2(n)$ of the coupler 600 and codes on the respective constellation to determine data with a code of the minimum distance, and determines the remaining part of the equation 12. The data determiner 700 comprises, as shown in FIG. 7, a real part calculator 710, an imaginary part calculator 720, a distance calculator 730, and a code selector 740.

First, the real part calculator 710 extracts the real part of the complex signal $\tilde{d}_1(n), \tilde{d}_2(n)$ fed into the data determiner 700 from the coupler 600, and the imaginary part calculator 720 extracts the imaginary part of the complex signal.

The distance calculator 730 receives the output signals of the real part calculator 710 and the imaginary part calculator 720 and calculates the distances between the output signals and all the codes on the modified constellation.

The code selector 740 determines a code having the least deviation from the distance calculated by the distance calculator 730 and outputs the complex value $\hat{d}_1(n), \hat{d}_2(n)$ of the corresponding code.

Generally, a training process for adapting filter coefficients is necessary for the purpose of converging the adaptive receiver on the optimal solution. The reference signal selector 800 shown in FIG. 2 selects known data d(n) irrespective of the output data of the data determiner 700 and outputs them as b(n) in the training interval, because the receiver 50 has the information of the transmitted code value in the training interval or the pilot transmission interval. If it is not in the training interval, the reference signal selector 800 selects the output $\hat{d}$(n) of the data determiner 700 and generates the selected signal as b(n). In the embodiment of the present invention, additional training data necessary to general adaptive receivers are not needed because pilot symbols regularly inserted are used instead of the training data.

Figure 8:
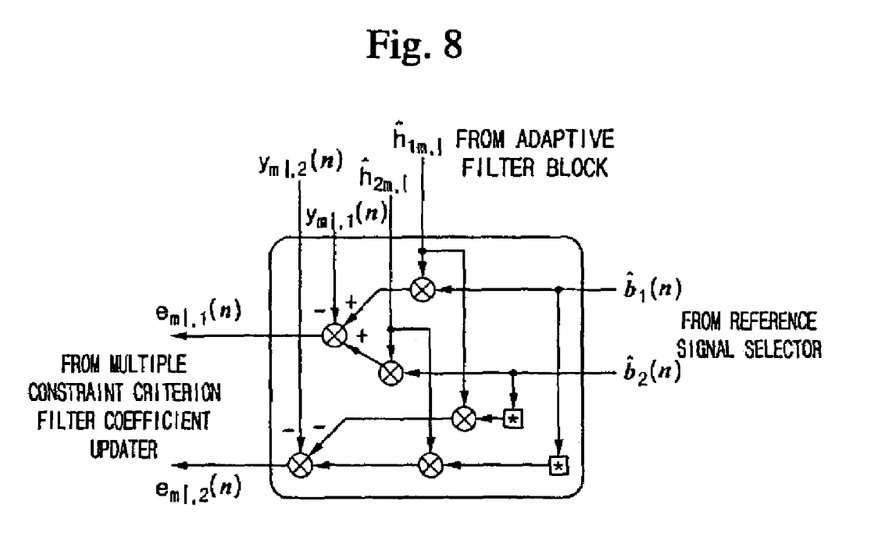
FIG. 8 illustrates the error generating block shown in FIG. 2.

FIG. 8 is a diagram of the error generating blocks 510, 520, 530, and 540 shown in FIG. 2, in which an error generating block for the l-th path of the m-th receiver antenna is illustrated.

The error generating blocks 510, 520, 530, and 540 comprise, as shown in FIG. 8, two complex conjugate calculators 511 and 512, four multipliers 513, 514, 515, and 516, and two summators 517 and 518.

First, the complex conjugate calculators 511 and 512 calculate complex conjugates for the output $\hat{b}_1(n), \hat{b}_2(n)$ of the reference signal selector 800.

The multipliers 513 and 514 multiply the output of the simple mean channel estimator 412 by the output of the reference signal selector 800 to output $\hat{h}_{1m,l} \cdot \hat{b}_1(n)$ and $\hat{h}_{2m,l} \cdot \hat{b}_2(n)$, respectively; and the multipliers 515 and 516 multiply the outputs of the complex conjugate calculators 511 and 512 by the output of the simple mean channel estimator 412 to output $\hat{h}_{1m,l} \cdot \hat{b}_2^*(n)$ and $\hat{h}_{2m,l} \cdot \hat{b}_1^*(n)$, respectively.

The summator 517 sums the outputs of the multipliers 513 and 514 and subtracts the output $y_{ml,1}(n)$ of the adaptive filter 411 from the sum to output $\hat{h}_{1m,l} \cdot \hat{b}_1(n) + \hat{h}_{2m,l} \cdot \hat{b}_2(n) - y_{ml,1}(n)$ as an error signal $e_{ml,1}(n)$ to the multiple constraint criterion filter coefficient updater 413; and the summator 518 subtracts the output of the multiplier 515 and the output $y_{ml,2}(n)$ of the adaptive filter 411 from the output of the multiplier 516 to output $\hat{h}_{2m,l} \cdot \hat{b}_1^*(n) - \hat{h}_{1m,l} \cdot \hat{b}_2^*(n) - y_{ml,2}(n)$ as an error signal $e_{ml,2}(n)$ to the multiple constraint criterion filter coefficient updater 413.

Figure 4:
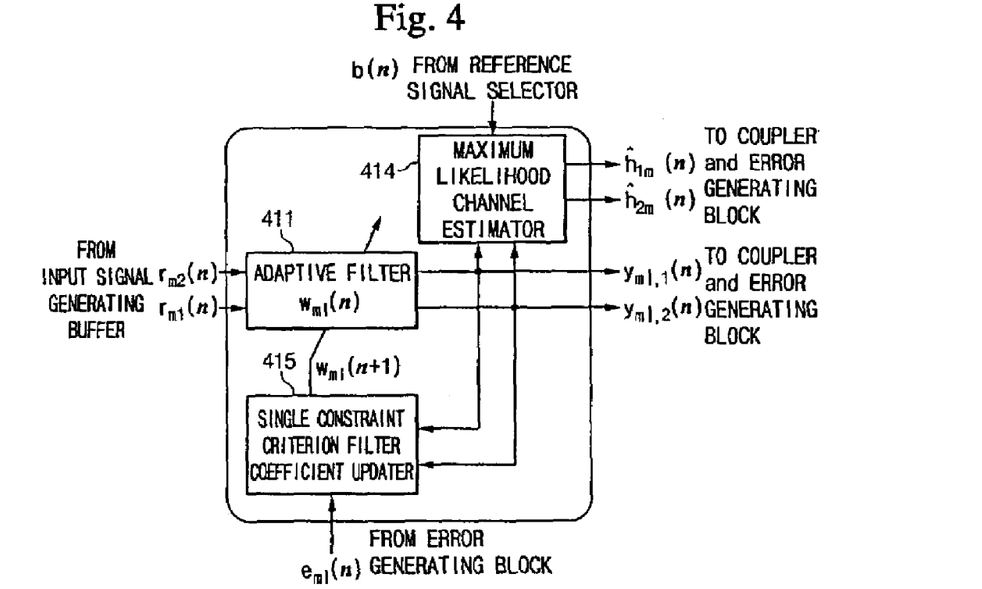
FIG. 4 illustrates another example of the adaptive filter block shown in FIG. 2.

FIG. 4 is a diagram of the adaptive filter block according to a second embodiment of the present invention, in which an adaptive filter block for the l-th path of the m-th receiver antenna is illustrated. The adaptive filter block comprises an adaptive filter 411, a maximum likelihood channel estimator 414 and a single constraint criterion filter coefficient updater 415. The same reference numeral is assigned to the same component having the same function as described in the first embodiment with reference to FIG. 3. Namely, the function of the adaptive filter shown in FIG. 4 is the same as that of the adaptive filter shown in FIG. 3.

As illustrated in FIG. 4, the second embodiment is the same as the first embodiment, excepting the adaptive filter coefficient updating method and the channel estimation method.

Let $w_{ml1}$ be an adaptive filter coefficient for odd received signals for the l-th multipath component of the m-th antenna and $w_{ml2}$ be an adaptive filter coefficient for even received signals, then the tap weights of the respective adaptive filters are determined so as to minimize the CMMSE cost function of the following equation:

$$\text{minimize}_{w_{ml1}} E\left[\|h_{1ml}(n)b_1(n) + h_{2ml}(n)b_2(n) - w_{ml1}^H r_{m1}(n)\|^2\right] \text{ subject to } w_{ml1}^H c_l = 1$$

$$\text{minimize}_{w_{ml2}} E\left[\|h_{2ml}(n)b_1^*(n) - h_{1ml}(n)b_2^*(n) - w_{ml2}^H r_{m2}(n)\|^2\right] \text{ subject to } w_{ml2}^H c_l = 1$$

Equation 14 where $w_{ml1}^o$ and $w_{ml2}^o$ are optimal filter coefficients that minimize a given constrained cost function. $w_{ml1}^o$ and $w_{ml2}^o$ are calculated by the Lagrangian multiplier method according to the following equation:

$$w_{ml1}^o = R_{r_{m1}}^{-1} c_l / c_l^H R_{r_{m1}}^{-1} c_l$$

$$w_{ml2}^o = R_{r_{m2}}^{-1} c_l / c_l^H R_{r_{m2}}^{-1} c_l$$

Equation 15 where $R_{r_{m1}} = E[r_{m1}(n) r_{m1}^H(n)]$ and $R_{r_{m2}} = E[r_{m2}(n) r_{m2}^H(n)]$ can be written to have the same value as the following equation, giving the same optimal solution:

$$R_{r_{m1}} = R_{r_{m2}} = R_{u_{ml}} + \sum_{l=1}^{L} E[(|h_{1ml}(n)|^2 + |h_{2ml}(n)|^2) \cdot c_l c_l^H]$$

Equation 16

As the two adaptive filters have the same optimal solution as in the equation 16, it is more effective to average two error values and use the mean value in updating the filter coefficient rather than to independently adapt the filters.

By using the adaptive filter coefficient $w_{ml}(n)$ for the l-th multipath component of the m-th receiver antenna for the l-th multipath component of the m-th receiver antenna in filtering for both odd and even symbols, the error values between the outputs of the adaptive filters from the odd and even received signals and the reference signal are properly combined to update the filter coefficient as the following equation 17. This updating process of the filter coefficient is performed with the single constraint criterion filter coefficient updater 415.

$$w_{ml}(n+1) = w_{ml}(n) + \mu P_{c_l}^{\perp}[e_{ml,1}^*(n) r_{ml,1}(n) + e_{ml,2}^*(n) r_{ml,2}(n)]$$

Equation 17 where $P_{c_l}^{\perp} = I - c_l c_l^H / (c_l^H c_l)$ represents an orthogonal projection matrix that projects all the vectors on a space orthogonal to the $c_l$ vector; and $e_{ml1}$ and $e_{ml2}$ are as defined in the first embodiment.

When adapting the adaptive filter 411 according to the equation 17, the inner product of the coefficient of the adaptive filter 411 for the corresponding path and the desired user's other multipath components is not always zero. When using the simple mean channel estimation method according to the equation 13 used in the first embodiment, the channel estimate is biased as in the following equation 18, causing a deterioration of channel estimation performance and hence a performance deterioration.

$$E[\hat{h}_{1ml}(n)] = \frac{1}{2N_p}\sum_{i=1}^{N_p}\sum_{l=1}^{L} h_{1mi}(n)w_{mi}^H(n-iQ)c_l$$

$$E[\hat{h}_{2ml}(n)] = \frac{1}{2N_p}\sum_{i=1}^{N_p}\sum_{l=1}^{L} h_{2mi}(n)w_{mi}^H(n-iQ)c_l$$

Equation 18

Accordingly, in the second embodiment, the maximum likelihood channel estimation method according to the following equation 19 is used to obtain unbiased channel estimates, and the channel estimation is performed with the maximum likelihood channel estimator 414.

$$\begin{bmatrix}\hat{h}_{1m1} & \hat{h}_{2m1}\\ \hat{h}_{1m2} & \hat{h}_{2m2}\\ \vdots & \vdots\\ \hat{h}_{1mL} & \hat{h}_{2mL}\end{bmatrix} =$$

$$\frac{1}{2N_p}\sum_{i=1}^{N_p}\begin{bmatrix}1 & w_{m1}^H(n-iQ)c_2 & \cdots & w_{m1}^H(n-iQ)c_L\\ w_{m2}^H(n-iQ)c_1 & 1 & \cdots & w_{m2}^H(n-iQ)c_L\\ \vdots & \vdots & \ddots & \vdots\\ w_{mL}^H(n-iQ)c_1 & w_{mL}^H(n-iQ)c_2 & \cdots & 1\end{bmatrix}^{-1}\cdot W_m^H A$$

Equation 19 where $W_m = [w_{m1}\ w_{m2}\ \ldots\ w_{mL}]$, $A = [d_1^*(n-iQ)r_{m1}(n-iQ) - d_2^*(n-iQ)r_{m2}(n-iQ)d_2^*$
$(n-iQ)r_{m1}(n-iQ) + d_1^*(n-iQ)r_{m2}(n-iQ)]$ The adaptive interference suppression receiver for the space-time block coded DS/CDMA system of Ref. 2 using more than two transmitter antennas can be realized with an adequate modification of the first and second embodiments of the present invention. The input signal generating buffers 310 and 320 transmit signals corresponding to the respective symbols of the whole coding block according to the symbol period separately by the signal receiving intervals, and the coupler 600 is properly modified to generate a combined signal suitable for the respective coding method. The individual channel estimators 412 and 414 properly combine the adaptive filter outputs by as many as the number of transmitter antennas and reference signals to perform channel estimation in the same manner as described in the first and second embodiments.

Figure 9:
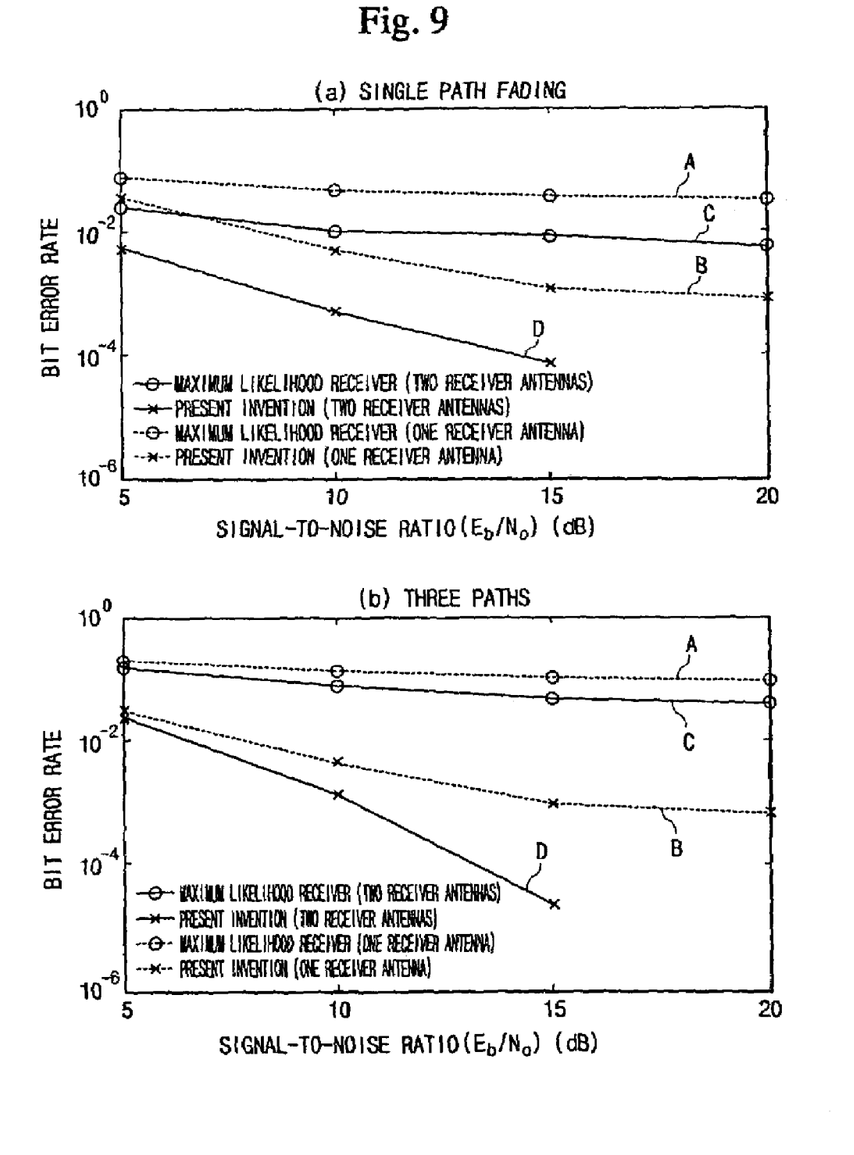
FIG. 9 is a graph showing the result of a performance simulation of the adaptive interference suppression receiver for a space-time block coded DS/CDMA system according to an embodiment of the present invention.

FIG. 9 is a graph showing the result of a simulation of the adaptive interference suppression receiver 50 for the space-time block coded DS/CDMA system according to the embodiment of the present invention, in which the result of a comparison (in regard to bit error rate) with the maximum likelihood receiver of Ref. 2 is shown.

For the simulation, a Rayleigh fading channel with one (refer to (a) of FIG. 9) or three (refer to (b) of FIG. 9) multipaths is used. The simulation involves fifty users having the same transmission power and a 3GPP short scrambling code having a period of 256 chips. The simulation is performed at a fading change rate of $10^{-3}$ that can be expressed by the multiplication $f_D T$ of Doppler frequency $f_D$ by the code period Time T, while switching the number of receiver antennas between one and two.

In (a) and (b) of FIG. 9, A is the performance result of the maximum likelihood receiver (with one receiver antenna) of Ref. 2; B is the performance result of the interference suppression receiver (with one receiver antenna) of the present invention; C is the performance result of the maximum likelihood receiver (with two receiver antennas) of Ref. 2; and D is the performance result of the interference suppression receiver (with two receiver antennas) of the present invention.

It can be seen from the result of the simulation that the present invention is much superior in data detection performance to the conventional maximum likelihood receiver of Ref. 2, irrespective of the number of multipaths.

Figure 10:
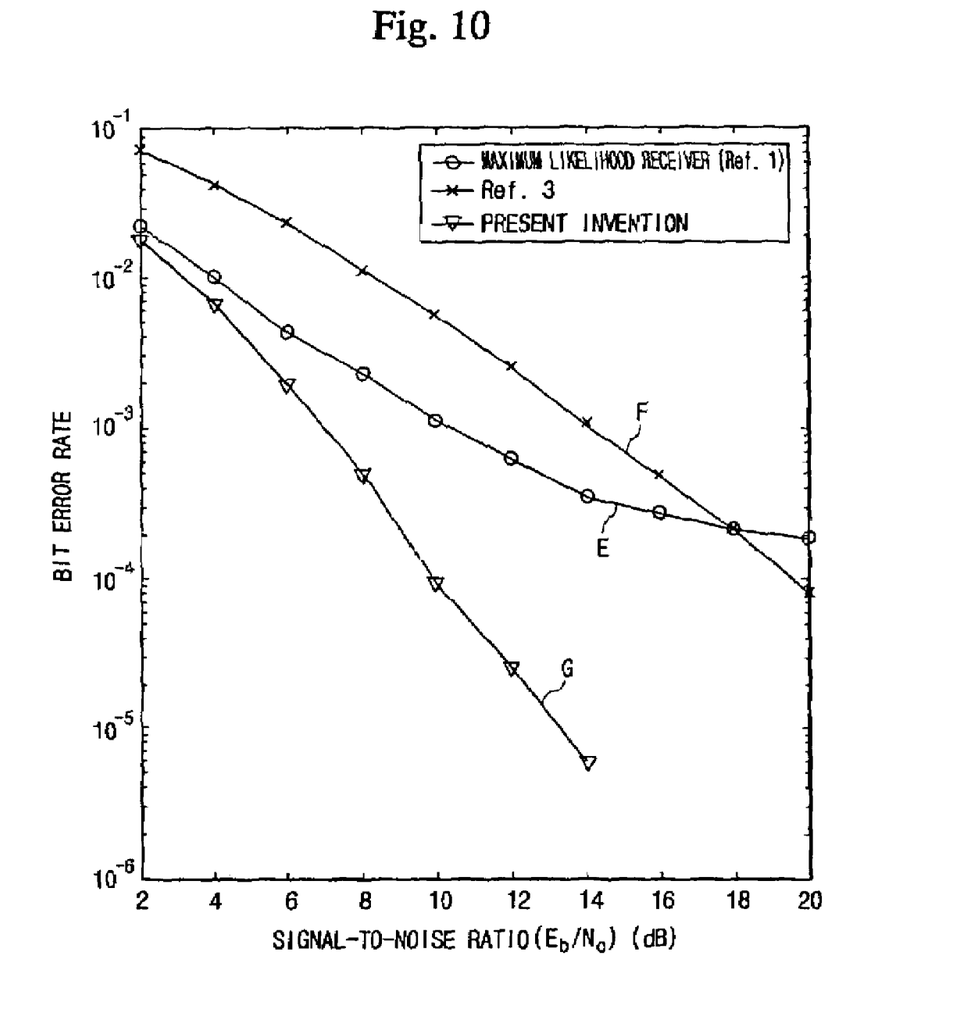
FIG. 10 is a graph showing the result of a performance simulation of the adaptive interference suppression receiver for a space-time block coded DS/CDMA system according to an embodiment of the present invention.

FIG. 10 is a graph showing the result of a simulation of the adaptive interference suppression receiver 50 for the space-time block coded DS/CDMA system according to the embodiment of the present invention, in which the result of a comparison (in regard to bit error rate) with a receiver expanded from the maximum likelihood receiver of Ref. 1 and the receiver of Ref. 3 in the CDMA environment is shown.

For the simulation, a single-path fading channel having a fading change rate of $10^{-3}$ that can be expressed by the multiplication $f_D T$ of Doppler frequency $f_D$ by the code period Time T is used. In this channel environment, the simulation is performed with two receiver antennas, one desired user and one interfering user having a 100-fold power. The spreading code used in the simulation is a gold code having a period of 63.

In FIG. 10, E is the performance result of the maximum likelihood receiver of Ref. 1; F is the performance result of a receiver expanded from the receiver of Ref. 3 in the CDMA environment; and G is the performance result of the interference suppression receiver (with two receiver antennas) of the present invention.

It can be seen from the result of the simulation that the present invention is much superior in data detection performance to the receiver expanded from the maximum likelihood receiver of Ref. 1 and the receiver of Ref. 3 in the CDMA environment.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention, if applied to a CDMA receiver, has a higher data detection performance than the conventional maximum likelihood receiver in the multipath fading channel environment that is an actual mobile communication environment, providing high-speed and high-quality services and increasing the service area of one base station.

Also, the present invention effectively eliminates MAI without a loss of the reception diversity gain.

Also, the present invention lowers the transmission power of the terminal, increases the life time of the battery in the terminal, and removes MAI to eliminate a stern power control.

Furthermore, the present invention only uses information concerning the desired user signals (i.e., spreading code and synchronization information) without a need for signals of all the users, and can be readily applied to the terminal as well as the base station.

What is claimed is:

1. An adaptive interference suppression receiver for a DS (Direct Sequence)/CDMA (Code Division Multiple Access) communication system, which receives via a multipath fading channel a space-time block coded signal spread with another spreading code by users, and despreads the received signal, the adaptive interference suppression receiver comprising:

at least two input signal generators coupled to at least two receiver antennas for signal reception, respectively, the input signal generators outputting a part of the received signals of the respective receiver antennas that has a transfer code of a corresponding coding block;

adaptive filter blocks coupled to the at least two input signal generators, respectively, the adaptive filter blocks filtering a complex signal output from the input signal generators with a tap weight updated based on at least one constraint MMSE (Minimum Mean Square Error) criterion and estimating phase and amplitude components of a specific user channel using the resultant filtering output signal to generate a channel-estimated signal, the number of the adaptive filter blocks being the same as the number of multipaths per one input signal generator;

a signal restorer for combining the channel-estimated signal and the filtering output signal received from the adaptive filter blocks for all multipath components and restoring an original signal that is intended to be transferred by the specific user;

a signal selector for selecting either one of a known training data signal or the restored signal of the signal restorer; and error generators for comparing the channel-estimated signal and the filtering output signal received from the adaptive filter blocks with the signal from the signal selector and calculating an error between the two signals for update of a tap weight in the adaptive filter blocks, the number of the error generators being the same as the number of the adaptive filter blocks.

2. The adaptive interference suppression receiver as claimed in claim 1, wherein the adaptive filter blocks comprise:

an adaptive filter for filtering the output signal of the input signal generators according to the tap weight;

a simple mean channel estimator for performing simple mean channel estimation using the filtering output signal of the adaptive filter and the output signal of the signal selector; and a multiple constraint criterion filter coefficient updater for regulating the tap weight of the adaptive filter based on at least two constraint MMSE criteria using the error signal of the error generators and the output signal of the adaptive filter.

3. The adaptive interference suppression receiver as claimed in claim 2, wherein the at least two constraint MMSE criteria substantially constrain the inner product of the tap weight $w_{ml1}, w_{ml2}$ of the adaptive filter block for the l-th multipath component of the m-th receiver antenna and a spreading code vector $c_l$ of the corresponding multipath component to "1" and the inner product of the tap weight $w_{ml1}, w_{ml2}$ and a spreading code vector $c_i (i \neq l)$ of another multipath component to 0, thereby minimizing the error calculated by the error generators, the at least two constraint MMSE criteria being defined as the following equations:

$$\text{minimize}_{w_{ml1}} E\left[\left\|\hat{h}_{1ml}(n)b_1(n) + \hat{h}_{2ml}(n)b_2(n) - w_{ml1}^H r_{m1}(n)\right\|^2\right] \text{ subject to } C^H w_{ml1} = g_l$$

$$\text{minimize}_{w_{ml2}} E\left[\left\|\hat{h}_{2ml}(n)b_1^*(n) + \hat{h}_{1ml}(n)b_2^*(n) - w_{ml2}^H r_{m2}(n)\right\|^2\right] \text{ subject to } C^H w_{ml2} = g_2$$

wherein E is a mean value; $\hat{h}_{1ml}(n)$ is a channel estimated for the l-th multipath component between the first transmitter antenna and the m-th receiver antenna; $\hat{h}_{2ml}(n)$ is a channel estimated for the l-th multipath component between the second transmitter antenna and the m-th receiver antenna; $b_1(n), b_2(n)$ is the output signal of the signal selector for a corresponding coding block; $r_{m1}(n)$ is a vector corresponding to an interval of receiving odd transfer symbols of the n-th coding block; $r_{m2}(n)$ is a vector corresponding to an interval of receiving even transfer symbols of the n-th coding block; $g_1$ is a vector having a size of L×1 where the l-th term is "1" and the others are all "0", the vector being a constraint criterion added to extract only properly synchronized signals by the respective multipaths from a frequency-selective fading channel and to remove the effect of the desired user's other multipaths; $C=[c_1\ c_2\ \ldots\ c_L]$; and the subscript H represents a Hermitian operation.

4. The adaptive interference suppression receiver as claimed in claim 3, wherein the adaptive filter blocks update the tap weight $w_{ml}(n)$ that combines errors for the respective symbols according to the following equation and satisfies at least one constraint criterion, based on that the tap weight $w_{ml}(n) = w_{ml1}(n), w_{ml2}(n)$ satisfying the MMSE criterion has a same solution:

$$w_{ml}(n+1) = w_{ml}(n) + \mu P_C^\perp [e_{ml,1}^*(n) r_{m,1}(n) + e_{ml,2}^*(n) r_{m,2}(n)]/2$$

wherein $P_C^\perp = I - C(C^H C)^{-1} C^H$ represents an orthogonal projection matrix that projects all the vectors on a space orthogonal to C;

$$e_{ml1} = \hat{h}_{1ml}(n) b_1(n) + \hat{h}_{2ml}(n) b_2(n) - w_{ml}^H r_{m1}(n)$$

$$e_{ml2} = \hat{h}_{2ml}(n) b_1^*(n) - \hat{h}_{1ml}(n) b_2^*(n) - w_{ml}^H r_{m2}(n)$$

wherein $\mu$ is a step size that determines how fast the tap weight is changed; and the subscript * represents a complex conjugate operation.

5. The adaptive interference suppression receiver as claimed in claim 3, wherein the simple mean channel estimator estimates, for a predetermined number of received pilot symbols, a channel of the l-th multipath component between each transmitter antenna and the m-th receiver antenna by multiplying the filtering output signal of the adaptive filter by a complex conjugate of the output signal of the signal selector and then averaging the multiplication results according to the following equation:

$$\hat{h}_{1ml}(n) = \frac{1}{2N_p} \sum_{i=1}^{N_p} w_{ml}^H(n - iQ)(d_1^*(n - iQ) r_{m1}(n - iQ) - d_2^*(n - iQ) r_{m2}(n - iQ))$$

-continued $$\hat{h}_{2ml}(n) = \frac{1}{2N_P}\sum_{i=1}^{N_P} w_{ml}^H(n-iQ)(d_2^*(n-iQ)r_{m1}(n-iQ) + d_1^*(n-iQ)r_{m2}(n-iQ))$$

wherein $N_P$ is the number of consecutive pilot symbols used for channel estimation; and Q is a pilot symbol insertion period.

6. The adaptive interference suppression receiver as claimed in claim 1, wherein the adaptive filter blocks comprises:
   an adaptive filter for filtering the output signal of the input signal generators according to the tap weight;
   a maximum likelihood channel estimator for performing maximum likelihood channel estimation using the filtering output signal of the adaptive filter and the output signal of the signal selector; and
   a single constraint criterion filter coefficient updater for regulating the tap weight of the adaptive filter based on a single constraint MMSE criterion using the error signal of the error generators and the output signal of the adaptive filter.

7. The adaptive interference suppression receiver as claimed in claim 6, wherein the single constraint MMSE criterion substantially constrains the inner product of the tap weight $w_{ml1}, w_{ml2}$ of the adaptive filter block for the l-th multipath component of the m-th receiver antenna and a spreading code vector $c_l$ of the corresponding multipath component to "1", thereby minimizing the error calculated by the error generators, the single constraint MMSE criterion being defined as the following equations:

$$\text{minimize}_{w_{ml1}} E\left[\|h_{1ml}(n)b_1(n) + h_{2ml}(n)b_2(n) - w_{ml1}^H r_{m1}(n)\|^2\right] \text{ subject to } w_{ml1}^H c_l = 1$$

$$\text{minimize}_{w_{ml2}} E\left[\|h_{2ml}(n)b_1^*(n) - h_{1ml}(n)b_2^*(n) - w_{ml2}^H r_{m2}(n)\|^2\right] \text{ subject to } w_{ml2}^H c_l = 1$$

wherein E is a mean value; $h_{1ml}(n)$ is a channel estimated for the l-th multipath component between the first transmitter antenna and the m-th receiver antenna; $h_{2ml}(n)$ is a channel estimated for the l-th multipath component between the second transmitter antenna and the m-th receiver antenna; $b_1(n), b_2(n)$ is the output signal of the signal selector for a corresponding coding block; $r_{m1}(n)$ is a vector corresponding to an interval of receiving odd transfer symbols of the n-th coding block; $r_{m2}(n)$ is a vector corresponding to an interval of receiving even transfer symbols of the n-th coding block; and the subscript H represents a Hermitian operation.

8. The adaptive interference suppression receiver as claimed in claim 7, wherein the adaptive filter blocks update the tap weight $w_{ml}(n)$ that combines errors for the respective symbols according to the following equation and satisfies the single constraint criterion, based on that the tap weight $w_{ml}(n)=w_{ml1}(n), w_{ml2}(n)$ satisfying the MMSE criterion has a same solution:

$$w_{ml}(n+1) = w_{ml}(n) + \mu P_C^{\perp}[e_{ml,1}^*(n)r_{ml,1}(n) + e_{ml,2}^*(n)r_{ml,2}(n)]$$

wherein $P_{c_l}^{\perp} = I - c_l c_l^H / (c_l^H c_l)$ represents an orthogonal projection matrix that projects all the vectors on a space orthogonal to $C_l$;

$$e_{ml1} = \hat{h}_{1ml}(n)b_1(n) + \hat{h}_{2ml}(n)b_2(n) - w_{ml}^H r_{m1}(n)$$

$$e_{ml2} = \hat{h}_{2ml}(n)b_1^*(n) - \hat{h}_{1ml}(n)b_2^*(n) - w_{ml}^H r_{m2}(n)$$

wherein $\mu$ is a step size that determines how fast the tap weight is changed; and the subscript * represents a complex conjugate operation.

9. The adaptive interference suppression receiver as claimed in claim 7, wherein the maximum likelihood channel estimator estimates, for a predetermined number of received pilot symbols, a channel of the multipath component between each transmitter antenna and the m-th receiver antenna by multiplying the filtering output signal of the adaptive filter by a complex conjugate of the output signal of the signal selector and then averaging the multiplication results according to the following equation:

$$\begin{bmatrix} \hat{h}_{1ml} & \hat{h}_{2ml} \\ \hat{h}_{1m2} & \hat{h}_{2m2} \\ \vdots & \vdots \\ \hat{h}_{1mL} & \hat{h}_{2mL} \end{bmatrix} = \frac{1}{2N_P}\sum_{i=1}^{N_P}\begin{bmatrix} 1 & w_{ml}^H(n-iQ)c_2 & \cdots & w_{ml}^H(n-iQ)c_L \\ w_{m2}^H(n-iQ)c_1 & 1 & \cdots & w_{m2}^H(n-iQ)c_L \\ \vdots & \vdots & \ddots & \vdots \\ w_{mL}^H(n-iQ)c_1 & w_{mL}^H(n-iQ)c_2 & \cdots & 1 \end{bmatrix}^{-1} \cdot W_m^H A$$

wherein $W_m = [w_{m1} \; w_{m2} \; \ldots \; w_{mL}]$, $A = [d_1^*(n-iQ)r_{m1}(n-iQ) - d_2^*(n-iQ)r_{m2}(n-iQ)d_2^*(n-iQ)r_{m1}(n-iQ) + d_1^*(n-iQ)r_{m2}(n-iQ)]$ 10. The adaptive interference suppression receiver as claimed in claim 2, wherein the signal restorer comprises:
    a coupler for receiving the output signal $y_{ml,1}(n), y_{ml,2}(n)$ of the adaptive filter and the resultant signal of channel estimation $\hat{h}_{1ml}(n)\hat{h}_{2ml}(n)$ and combining them for all the multipath components to generate a combined signal $\bar{d}_1(n), \bar{d}_2(n)$; and
    a data determiner for restoring an original signal $\bar{d}_1(n), \bar{d}_2(n)$ that is intended to be transferred by the specific user, using the combined signal $\bar{d}_1(n), \bar{d}_2(n)$ of the coupler according to the following equation:

$$\hat{d}_1 = \arg\min_{\hat{d}} \left\| \sum_{m=1}^{M}\sum_{l=1}^{L}\left[y_{ml,1}(n)\hat{h}_{1ml}^*(n) + y_{ml,2}^*(n)\hat{h}_{2ml}(n)\right] - \hat{d} \right\|$$

$$\hat{d}_2 = \arg\min_{\hat{d}} \left\| \sum_{m=1}^{M}\sum_{l=1}^{L}\left[y_{ml,2}(n)\hat{h}_{2ml}^*(n) - y_{ml,2}^*(n)\hat{h}_{1ml}(n)\right] - \hat{d} \right\|$$

wherein $\hat{d}$ is a symbol on a constellation corresponding to the combined signal $\bar{d}_1(n), \bar{d}_2(n)$.

11. The adaptive interference suppression receiver as claimed in claim 10, wherein the coupler comprises:

energy calculators for receiving the output signal of the adaptive filter and the resultant signal of channel estimation and calculating energies of the respective multipaths for each receiver antenna, the number of the energy calculators being the same as the number of the adaptive filter blocks; and summators for summing the energies calculated by the energy calculators, the number of the summators being the same as the number of transmitter antennas.

12. The adaptive interference suppression receiver as claimed in claim 10, wherein the data determiner comprises:

a real part calculator for extracting a real part from the combined signal of the coupler;

an imaginary part calculator for extracting an imaginary part from the combined signal of the coupler;

a distance calculator for receiving output signals of the real part calculator and the imaginary part calculator and calculating a distance from all codes on a modified constellation; and a code selector for determining a code having the least deviation from the distance calculated by the distance calculator and generating a complex value to the signal selector.

* * * * *